(12) United States Patent
Takekado

(10) Patent No.: US 6,295,184 B1
(45) Date of Patent: Sep. 25, 2001

(54) HEAD ACTUATOR MECHANISM AND MAGNETIC DISK DRIVE INCLUDING THE SAME

(75) Inventor: Shigeru Takekado, Tokyo (JP)

(73) Assignee: Kabushiki Kaisha Toshiba (JP)

( * ) Notice: Subject to any disclaimer, the term of this patent is extended or adjusted under 35 U.S.C. 154(b) by 0 days.

(21) Appl. No.: 09/156,299

(22) Filed: Sep. 17, 1998

(30) Foreign Application Priority Data

Sep. 18, 1997 (JP) .................................................. 9-253703
May 15, 1998 (JP) ................................................ 10-133321

(51) Int. Cl.$^7$ .................................................. G11B 21/10
(52) U.S. Cl. ..................... 360/294.4; 360/78.05
(58) Field of Search ........................... 360/78.05, 294.3, 360/294.4, 75, 78.12

(56) References Cited

U.S. PATENT DOCUMENTS

| | | | | |
|---|---|---|---|---|
| 4,145,725 | * | 3/1979 | Wallis | 360/78.05 X |
| 5,267,110 | * | 11/1993 | Ottesen et al. | 360/78.05 X |
| 5,452,275 | * | 9/1995 | Ogawa | 360/78.05 X |
| 5,521,778 | | 5/1996 | Boutaghou et al. | |
| 5,682,076 | * | 10/1997 | Zumeris | 360/78.05 X |
| 5,745,319 | | 4/1998 | Takekado et al. | 360/78.05 |
| 6,034,834 | * | 3/2000 | Yoshikawa et al. | 360/78.05 X |
| 6,088,187 | * | 7/2000 | Takaishi | 360/78.05 |

FOREIGN PATENT DOCUMENTS

| | | | | |
|---|---|---|---|---|
| 63-155478 | * | 6/1988 | (JP) | 360/78.05 |
| 4-248170 | | 9/1992 | (JP) . | |
| 5-128757 | | 5/1993 | (JP) . | |
| 6-251511 | * | 9/1994 | (JP) . | |
| 9-82048 | | 3/1997 | (JP) . | |

* cited by examiner

Primary Examiner—David Hudspeth
Assistant Examiner—James L. Habermehl
(74) Attorney, Agent, or Firm—Gray Cary Ware & Freidenrich LLP

(57) ABSTRACT

A driving section of a head actuator mechanism rotatably supporting a magnetic disk includes a voice coil, and a piezo-electric element for cutting off a resonance resulting from a drive of the voice coil. The driving section is arranged on a side opposite to an arm across a rotational axis of the head actuator mechanism. The voice coil and the piezo-electric element are held by a holding frame which is molded of a resin integrally with these voice coil and piezo-electric element.

5 Claims, 10 Drawing Sheets

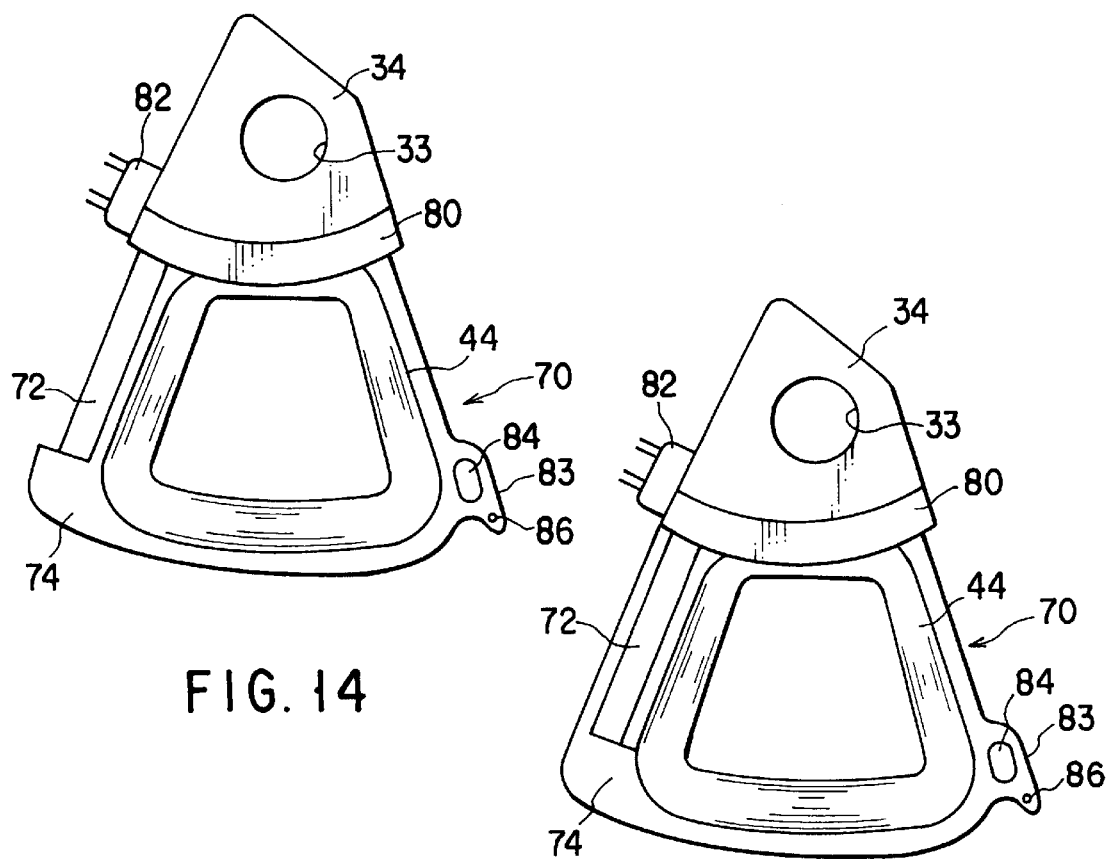
FIG. 14
FIG. 15
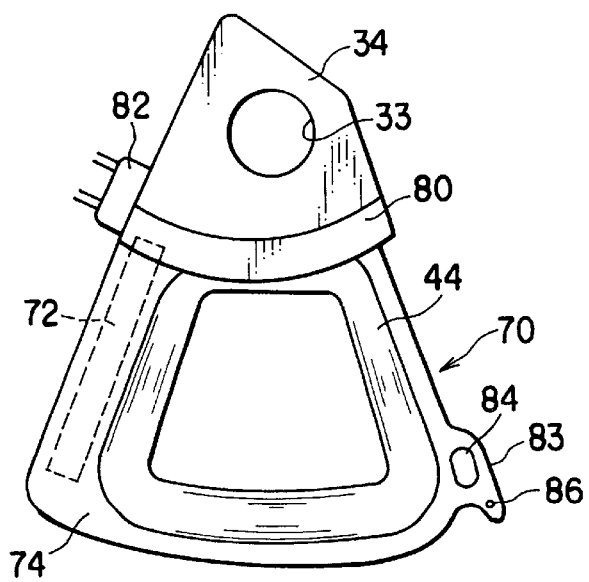
FIG. 16

HEAD ACTUATOR MECHANISM AND MAGNETIC DISK DRIVE INCLUDING THE SAME

BACKGROUND OF THE INVENTION

The present invention relates to a head actuator mechanism which moves a magnetic head for recording and reading information with respect to a magnetic disk so that the magnetic head is positioned on a desired position, and to a magnetic disk drive including the head actuator mechanism.

A magnetic disk drive, for example, a small-sized hard disk drive (hereinafter, referred to simply as HDD) has been conventionally used as a built-in memory of a lap-top type or notebook type personal computer.

In general, in the HDD, a positioning control for the magnetic heads is carried out by means of a servo system which executes speed control and position control largely classified. The servo system positions the magnetic heads at a target position by controlling a head actuator mechanism for supporting and moving the magnetic heads in the radial direction of a magnetic disk.

In recent years, with high performance of a personal computer, there has been deeply made a request of an HDD which is made into a small size and has a large memory capacity. However, in order to increase the memory capacity of the HDD, a track density and linear recording density of the magnetic disk serving as a recording medium need to be improved so that high recording density of the magnetic disk can be achieved.

In order to realize the aforesaid high recording density, various trials have been made. In accordance with increase in the recording density, there is required a technique of positioning the magnetic head to a target track on the magnetic disk with high precision. For this reason, the head actuator mechanism has been variously devised together with control technology of the aforesaid serve system.

Generally, the HDD is provided with a case made of an aluminum alloy or the like, in which are arranged a magnetic disk, a spindle motor for supporting and rotating the magnetic disk, a rotary type head actuator mechanism for rotatably supporting the magnetic head with respect to the magnetic disk, a voice coil motor (hereinafter, referred simply to as VCM) for driving the head actuator mechanism, and a circuit board. The magnetic disk makes a high rotational speed motion by means of the spindle motor. Also, the circuit board is mounted with various circuit components such as a magnetic head amplifier for amplifying a read signal from the magnetic head.

The head actuator mechanism includes a suspension for supporting a magnetic head, a support arm for supporting the suspension and transmitting a driving force, and an actuator body which supports the support arm and is driven around a rotational shaft by a driving force of the VCM.

The VCM includes a driving coil mounted on a substantially V-shaped coil holding frame, a permanent magnet, and yokes. The coil holding frame extends from the actuator body in a direction reverse to the support arm. The coil holding frame and the driving coil are rotatable integrally with the head actuator mechanism. Further, the permanent magnet and the yoke constituting a magnetic circuit are fixed on the case side, and are arranged facing each other on opposite sides of the driving coil. The VCM drives the actuator by an interaction of a magnetic field generated from the permanent magnet with an electromagnetic force generated by exciting the driving coil.

The servo system controls a driving current of the VCM on the basis of a servo data previously recorded in a servo area of the magnetic disk, and then, carries out a drive control of the actuator.

In the HDD having the construction as described above, the actuator is driven with high precision so that the magnetic head is high precisely positioned to a desired position; however, there is a hindrance when positioning the magnetic head. The hindrance is a mechanical vibration generated in components such as the support arm constituting the actuator, or the like.

The mechanical vibration of the head actuator mechanism includes a resonance peak due to a rotary spring characteristic of ball bearings provided in the actuator body, and peaks resulting from resonance modes of the head actuator mechanism itself.

The major resonance mode of the head actuator mechanism is estimated to be generated by a mode wherein the driving coil of the VCM and the coil holding frame holding the driving coil are deformed in a rotating (circumferential) direction of the magnetic disk when driving the head actuator mechanism. Further, the major resonance mode resulting from the structure of the head actuator mechanism itself is a high frequency of 1 kHz or more, and affects the servo system for carrying out a positioning control of the magnetic head. This is a factor of malfunction such as an off-track error.

More specifically, the vibration of the head actuator mechanism is a factor of lowering a positioning accuracy of the magnetic head, and in particular, causes a problem of lowering a recording density (track density) in a track direction.

Therefore, in order to prevent a bad influence to the servo system as much as possible, there are required to eliminate the mechanical vibration of the head actuator mechanism as much as possible and to provide a design or device for increasing a resonance frequency of the support arm or the like.

Further, there is a need of decreasing an off-track resulting from vibration applied from the outside of the HDD, vibration generated from the spindle motor and others in the HDD and the like. In this case, a gain cross frequency, at which gain crosses 0 dB and which is one of the open loop characteristic of the servo system, must be increased as much as possible.

A method of increasing the gain cross frequency in the servo system has been disclosed in Jpn. Pat Appln. KOKAI publication No. 51-36924, or in a document "Track follow-up control of magnetic drive 2-stage access servo system" (VOl. J75, No. 11, pages 653 to 662) published by Institute of electronic information and communication, for example.

In the aforesaid Publication and document, there has been proposed a system which is provided with a main actuator (VCM) for integrally moving a plurality of magnetic heads with a long stroke, and an auxiliary actuator (composed of a piezo-electric element) for finely moving the magnetic heads independently from each other.

The system has been also disclosed in Jpn. Pat. Appln. KOKAI publication No. 51-39012. The system disclosed in the above Publication is constructed in the following manner. More specifically, the magnetic head follows a narrow track pitch by a double servo system so that the main actuator having a heavy weight is driven in a low frequency band and the auxiliary actuator having a light weight is driven in a high frequency band.

Further, Jpn. Pat. Appln. KOKAI publications No. 51-36924, No. 3-69072, No. 3-102684 and No. 3-183070 disclose a system which is provided with an auxiliary actuator on each support arm supporting a magnetic head. In this system, individual magnetic heads are movable independently from each other by means of the auxiliary actuators.

In Jpn. Pat. Appln. KOKAI publications No. 3-69072, No. 3-102684 and No. 3-183070, there is a description on the case where the auxiliary actuator is applied to a dedicated servo system. More specifically, there is a description on a system in which the auxiliary actuator is used as means for correcting a so-called thermal off-track.

The thermal off-track is caused by the phenomenon that a plurality of support arms individually deform in a radius direction of the magnetic disk by a change in temperature on the outside and inside of an apparatus. For this reason, there has been employed a method of correcting only the DC component of the magnetic head on the basis of a positional information from a servo surface of the magnetic disk and a positional information from sectors of each data surface. In this case, an auxiliary actuator need to be provided for respective support arms, and further, must be individually controlled.

In the HDD having the construction mentioned above, since the main actuator and the auxiliary actuator are constructed integrally, a resonance frequency of the main actuator appears as a resonance frequency in the auxiliary actuator. Thus, it is difficult to broaden a servo band with the use of the auxiliary actuator.

In the case of a conventional head actuator mechanism which is provided with the auxiliary actuator for each support arm, the following problems is caused.

First, a piezo-electric element constituting the auxiliary actuator is required only for the number corresponding to that of the support arms. For this reason, in the case where a variation exists in characteristic of each piezo-electric element, there is high possibility to generate difference in fine movement of magnetic heads, flying characteristic of the magnetic head sliders or the like.

Further, a cable and driving circuit for driving the auxiliary actuator are required for the numbers corresponding to that of the support arms, and these auxiliary actuators must be individually controlled. Thus, the control becomes complicate.

Furthermore, the auxiliary actuators for the support arms are driven independently, so that a resonance mode of the whole structure of the actuator is induced. As a result, it is difficult to increase a servo band in the magnetic head positioning system.

BRIEF SUMMARY OF THE INVENTION

The present invention has been contrived in consideration of the aforesaid problems and its object is to provide a head actuator mechanism which can stably position a magnetic head with high precision, and can perform high density recording, and to provide a magnetic disk drive including the head actuator mechanism.

Further, another object of the present invention is to provide a head actuator mechanism which can stably position a magnetic head with high precision, and can improve a mechanical strength and assembling performance, and to provide a magnetic disk drive including the head actuator mechanism.

To achieve the above objects, the present invention provides a head actuator mechanism comprising:

a suspension supporting a magnetic head for reading and writing information with respect to a magnetic disk;

an arm supporting the suspension;

a support section which is rotatable around a predetermined rotational axis and supports the arm; and a driving section supported by the support section and arranged on a side opposite to the arm with respect to the rotational axis, the driving section having a driving coil for generating a driving force for moving the magnetic head in a radial direction of the magnetic disk, and an auxiliary driving section for depressing at least one of the resonances of the magnetic head resulting from the drive of the driving coil.

Further, to achieve the above objects, the present invention provides a magnetic disk drive comprising: a magnetic disk;

driving means supporting the magnetic head, for rotating the magnetic disk; a magnetic head which records and reads information with respect to the magnetic disk; and a head actuator mechanism having a suspension supporting the magnetic head, an arm supporting the suspension, a support section which is rotatable around a predetermined rotational axis and supports the arm, and a driving section supported by the support section and arranged on a side opposite to the arm with respect to the rotational axis;

the driving section having a driving coil for generating a driving force for moving the magnetic head in a radial direction of the magnetic disk, and an auxiliary driving section for depressing at least one of resonances of the magnetic head resulting from the drive of the driving coil.

The head actuator mechanism and the magnetic disk drive constructed as described above, are provided with the auxiliary driving section which depresses at least one of the resonances of the magnetic head resulting from the drive of the driving coil. Thus, it is possible to control the driving section so as to cancel the resonance of the magnetic head. Therefore, the magnetic head can be stably positioned with high accuracy.

Further, the head actuator mechanism and the magnetic disk drive according to the present invention include a servo system for controlling the operation of the driving coil and the piezo-electric element serving as the auxiliary driving section. The servo system has a filter which depresses a frequency component other than a predetermined frequency band including a resonance frequency generated in the magnetic head resulting from the drive of the driving coil, from a frequency component included in a positional error signal produced on the basis of a servo data read from the magnetic disk by the magnetic head, and drives the piezo-electric element on the basis of the positional error signal passing through the filter.

Further, the head actuator mechanism and the magnetic disk drive according to the present invention include a servo system for controlling the driving coil and the auxiliary driving section with the use of a digital control system. In the servo system, a sampling frequency when converting the positional error signal produced on the basis of a servo data read from the magnetic disk by the magnetic head into an A/D signal, is set to be equal to or higher than twice as much as a tertiary main resonance frequency with respect to a moving direction of the magnetic head, resulting from the drive of the driving coil.

With the above construction, since the auxiliary driving section is not operated in an unnecessary band, it is possible to improve a stabilization of the servo system.

Further, with the head actuator mechanism and the magnetic disk drive according to the present invention, the holding frame is molded of a resin integrally with the driving coil and the piezo-electric element, and holds them. Therefore, it is possible to improve a mechanical strength of the driving section, and to enhance a assembling performance, so that the driving section can be made thin and light.

Additional objects and advantages of the invention will be set forth in the description which follows, and in part will be obvious from the description, or may be learned by practice of the invention the objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments give below, serve to explain the principles of the invention.

FIGS. 1 to 9 show an HDD according to an embodiment of the present invention, in which:

FIG. 1 is an exploded perspective view showing the HDD;

FIG. 2 is a plane view showing a head actuator mechanism which is provided in the HDD;

FIG. 3 is a perspective view showing the head actuator mechanism;

FIG. 4 is an exploded perspective view showing the head actuator mechanism;

FIG. 7 is a plane view showing a spacer ring of the head actuator mechanism;

FIG. 8 is a block diagram showing a drive control system of the head actuator mechanism;

FIG. 9 is a view schematically showing a mechanical resonance mode of the head actuator mechanism;

FIG. 14 is a plane view showing an actuator driving section of a head actuator mechanism according to another embodiment of the present invention;

FIG. 15 is a plane view showing an actuator driving section of a head actuator mechanism according to still another embodiment of the present invention;

FIG. 16 is a plan 2 view showing an actuator driving section of a head actuator mechanism according to another embodiment of the present invention;

DETAILED DESCRIPTION OF THE INVENTION

An HDD according to an embodiment of the present invention will be described below with reference to the accompanying drawings.

Figure 1:
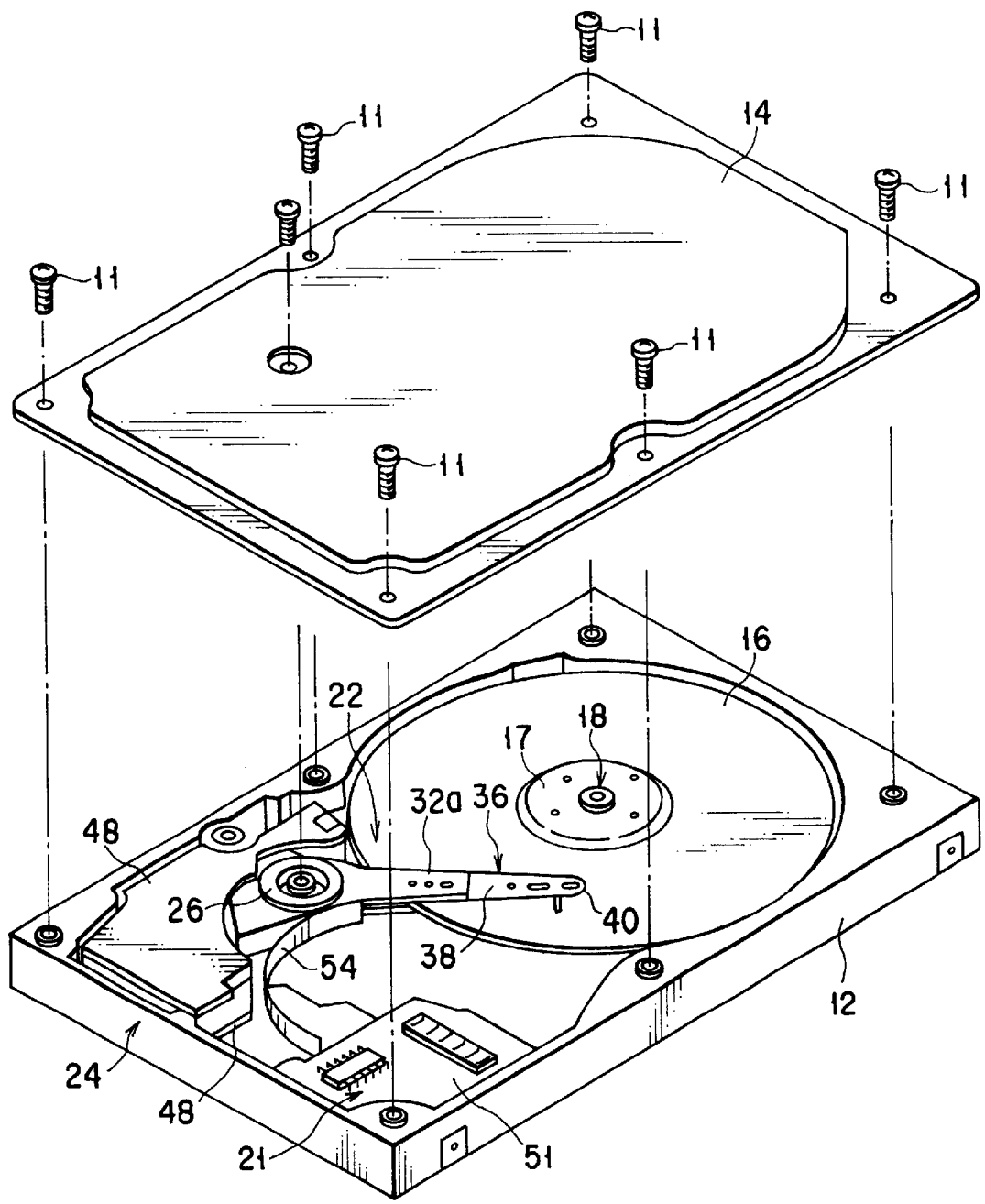

As shown in FIG. 1, the HDD comprises a rectangular case 12 which is formed of an aluminum alloy, and the like, and has an opening at an upper surface thereof, and a top cover 14 which is screwed onto the case 12 by means of a plurality of screws 11 so as to close the upper opening of the case 12.

In the case 12 are arranged a magnetic disk 16 serving as a magnetic recording medium, a spindle motor 18 for supporting and rotating the magnetic disk 16, a plurality of magnetic heads 40 for writing and reading information with respect to the magnetic disk, a rotary type head actuator mechanism 22 supporting these magnetic heads to be movable with respect to the magnetic disk 16, a voice coil motor 24 (hereinafter, referred simply to as VCM) for driving the head actuator mechanism 22, and a board unit 21 having a head IC and the like.

Further, on an outer surface of the bottom wall of the case 12a is screwed a printed circuit board (not shown) for controlling the operations of the spindle motor 18, the VCM 24, a piezo-electric element which will be described later and the magnetic head, via the board unit 21.

The magnetic disk 16 is formed having a diameter 65 mm (2.5 inches), and has a magnetic recording layer on each of an upper and lower surfaces thereof. Further, the magnetic disk 16 is coaxially fitted onto a hub (not shown) of the spindle motor 18, and is held by a clamp spring 17. Thus, the magnetic disk 16 is rotated at a predetermined speed by the spindle motor 18.

Figure 2:
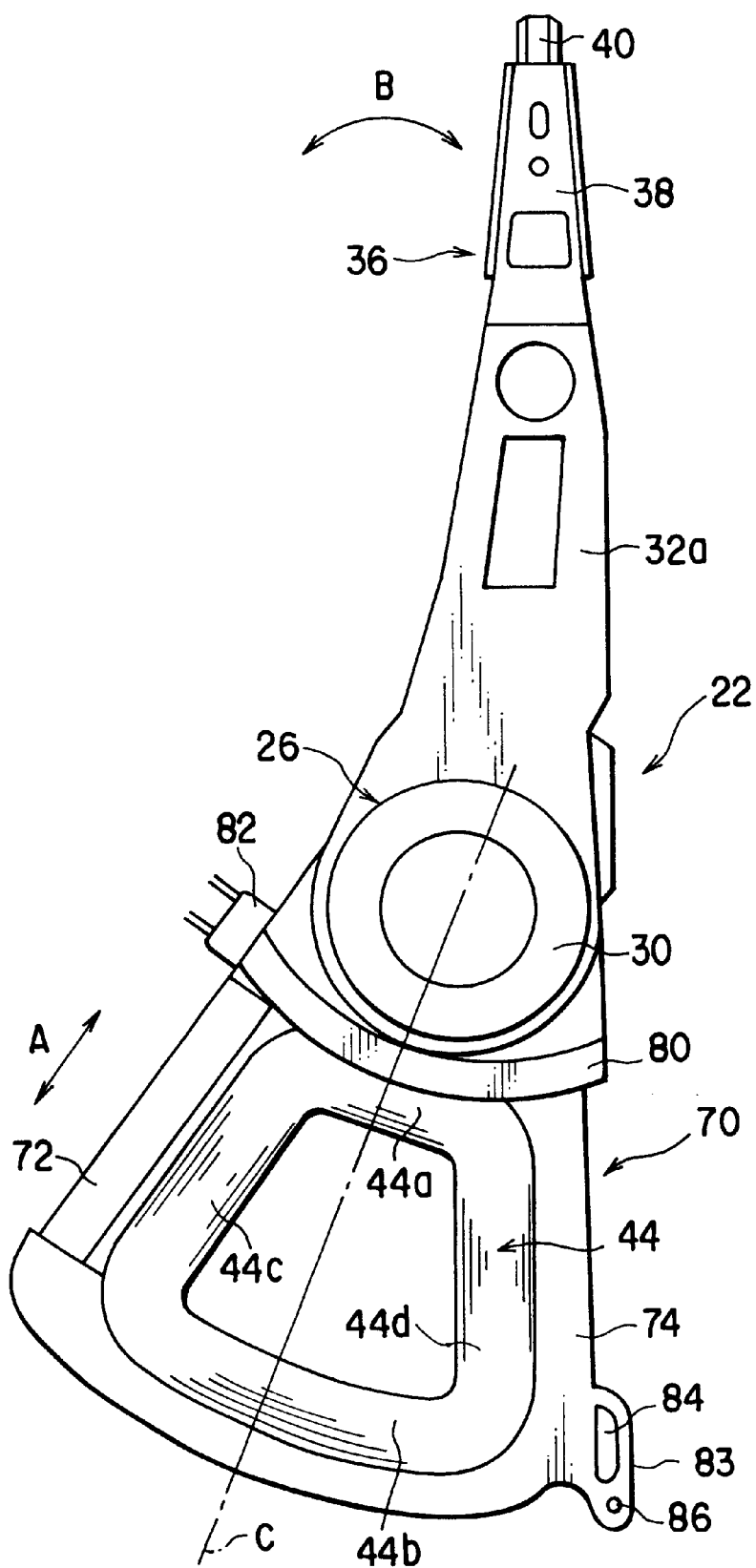
Figure 3:
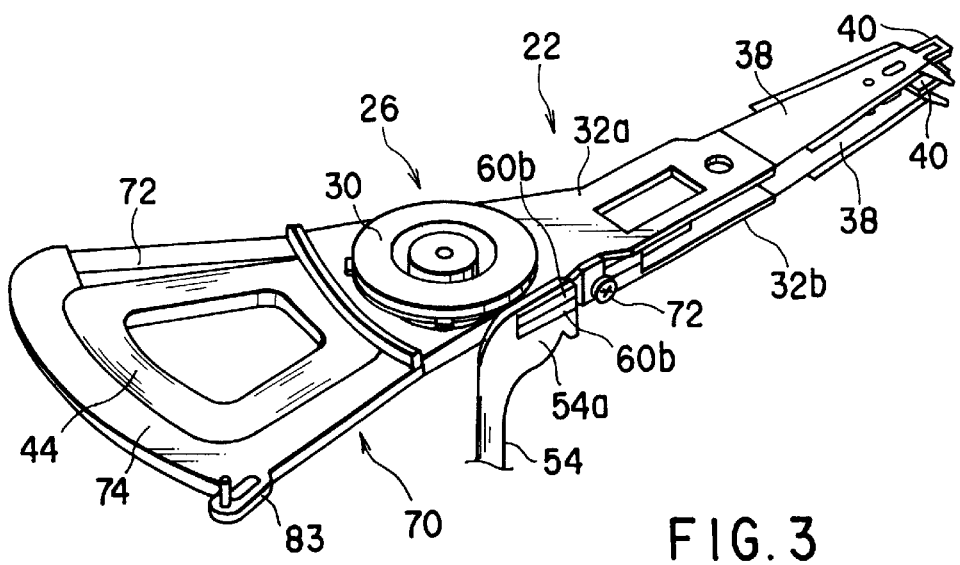
Figure 4:
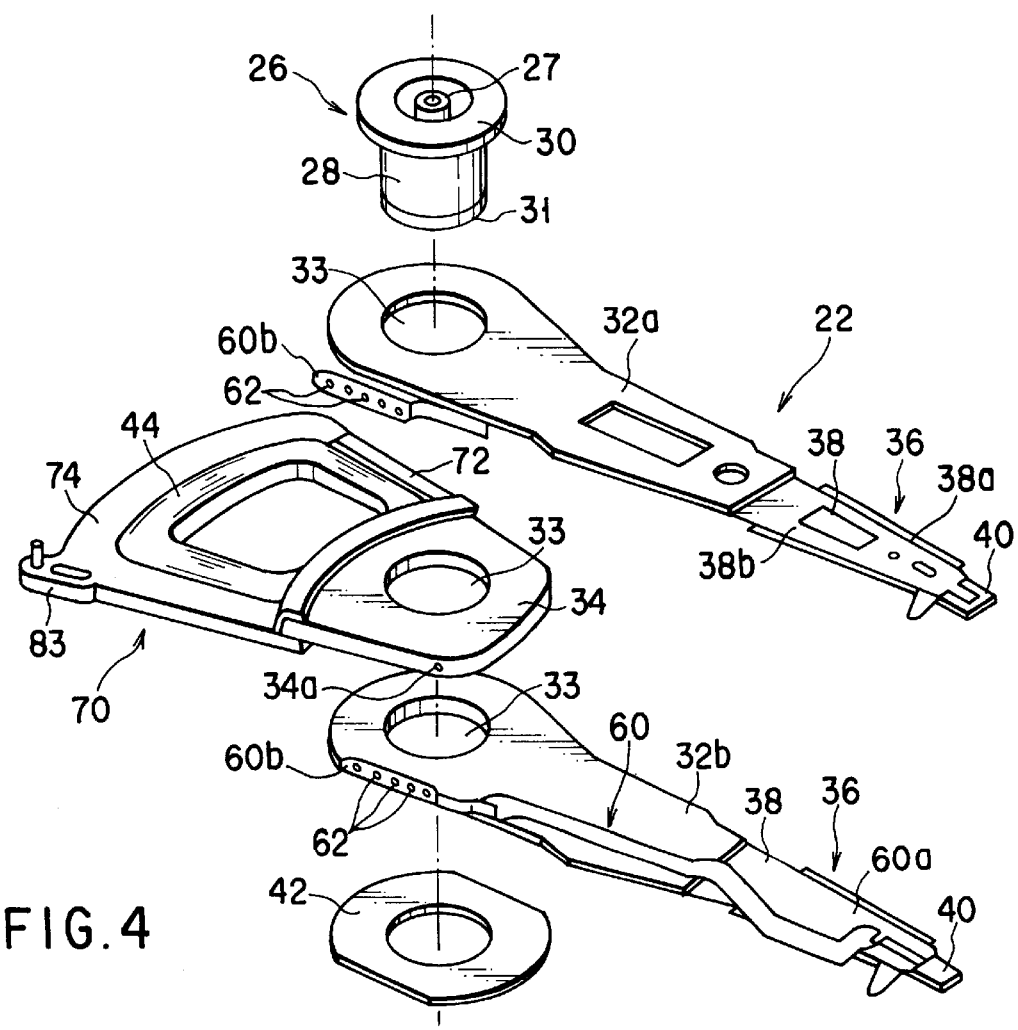
Figure 5A:
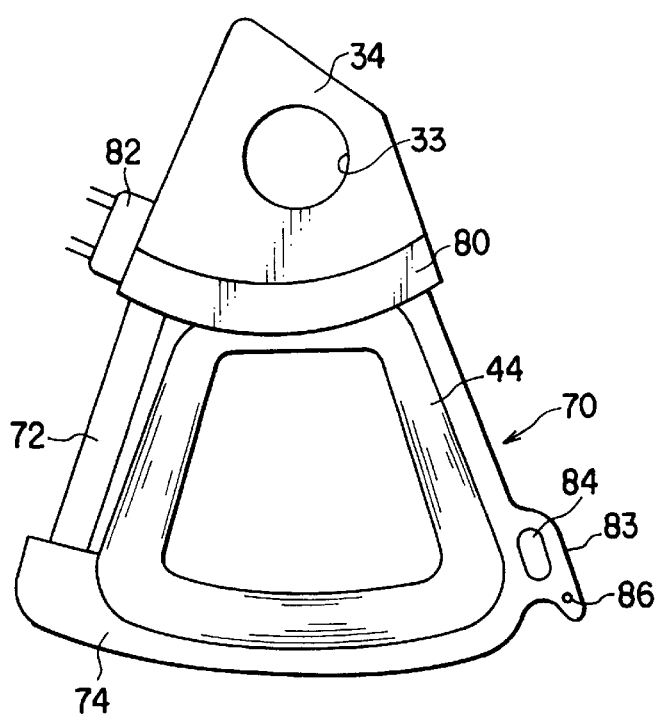
FIG. 5A is a plane view showing an actuator driving section of the head actuator mechanism.
Figure 5B:
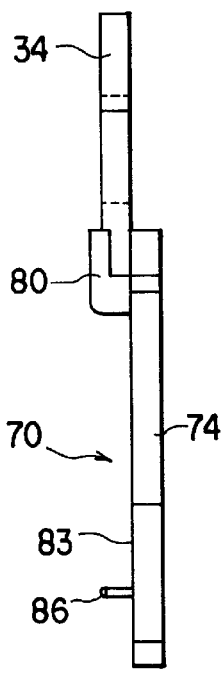
FIG. 5B is a side view showing the actuator driving section.

As shown FIG. 2 to FIG. 4, the head actuator mechanism 22 includes a bearing assembly 26 which is fixed on the bottom wall of the case 12. The bearing assembly 26 serving as a support section has a pivotal shaft 27 which stands perpendicular to the bottom wall of the case 12, and a cylindrical hub 28 rotatably supported on the pivotal shaft 27 via a pair of bearings. An upper portion of the hub 28 is formed with a ring-like flange 30, on the other hand, a lower portion of the hub 28 is formed with a threaded portion 31 at the outer periphery thereof.

Moreover, the head actuator mechanism 22 includes two arms 32a and 32b and a spacer ring 34 which are attached to the hub 28, and two magnetic head assemblies 36 supported by the respective arms.

The arms 32a and 32b are made of a stainless-based material such as SUS 304, and is formed like a flat plate having a thickness of 250 μm so as to have a predetermined rigidity. Further, one end, that is, a proximal end of each arm is formed with a circular through hole 33. Likewise, the spacer ring 34 is formed of a stainless-based material.

Each magnetic head assembly 36 includes an elongated plate-like suspension 38 which is elastically deformable, and a magnetic head 40 fixed to the distal end of the suspension 38. The suspensions 38 are formed of a plate spring, and the proximal ends of the suspensions 38 are fixed to the distal ends of the respective arms 32a and 32b by means of spot welding or bonding. Further, the suspensions 38 extend from these arms.

Each magnetic head 40 has a substantially rectangular slider and a recording and reproducing MR (magnetic resistance) head formed in the slider, and is fixed to a gimbals portion (not shown) provided on the distal end of the suspension 38. Further, each magnetic head 40 has four or five electrodes (not shown).

The arms 32a and 32b attached with magnetic head assemblies 36 are fitted on the outer periphery of the hub 28 in a state of being piled on the flange 30 by inserting the hub 28 into the through holes 33 of the arms. Also, the spacer ring 34 is fitted on the outer periphery of the hub 28 in a state of being interposed between the arms 32a and 32b.

Two arms 32a and 32b and the spacer ring 34, which are fitted on the outer periphery of the hub 28, are clamped between a nut 42 screwed to the threaded portion 31 of the hub 28 and the flange 30, and thus, are held on the outer circumferential surface of the hub 28. Two arms 32a and 32b are situated parallel with each other with a predetermined interval, and extend from the hub 28 into the identical direction.

The magnetic heads 40 of the magnetic head assemblies 36 attached to the arms 32a and 32b are situated so as to face each other, and are rotatable integrally with these arms and hub 28. Meanwhile, the spacer ring 34 serving as a holding section is formed with a threaded hole 34a for screwing an extending end portion of a main FPC which will be described later. Further, the spacer ring 34 is provided integrally with an actuator driving section 70 which extends in a direction separating from the arms 32a and 32b.

As shown in FIGS. 2 to 5, the actuator driving section 70 includes a voice coil 44 constituting a part of the VCM 24, and a piezo-electric element 72 functioning as an auxiliary driving section. These voice coil 44 and piezo-electric element 72 are arranged side by side, and are covered with a synthetic resin so as to be integrally held.

More specifically, the voice coil 44 is wounded into a substantially trapezoidal shape, and includes an inner circumferential portion 44a and an outer circumferential portion 44b which are formed into a circular arc substantially coaxial with the bearing assembly 26, and a pair of operating side portions 44c and 44d which extend in a substantially radial direction with respect to the bearing assembly 26. Further, the inner and outer circumferential portion 44a, 44b and an outside surface of one operating side portion 44d of the voice coil 44 are covered with a holding frame 74 made of a synthetic resin. The holding frame 74 has the substantially same thickness as the voice coil 44, and extends in a direction opposite to the arms 32a and 32b across the pivotal shaft 27.

Figure 6A:
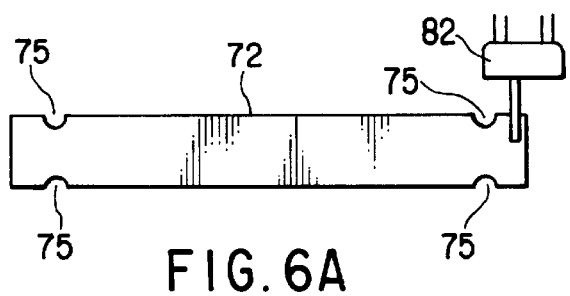
FIG. 6A is a side view showing a piezo-electric element of the actuator driving section.
Figure 6B:
FIG. 6B is a rear view showing the piezo-electric element of the actuator driving section.

The piezo-electric element 72 is formed in a shape of an elongated rectangular plate, and is arranged in substantially parallel with a side surface of the other operating side portion 44c of the voice coil 44. Further, the piezo-electric element 72 is held in a state that its two opposite end portions are embedded in the holding frame 74. As shown in FIGS. 6A and 6B, the opposite end portions of the piezo-electric element 72 are formed with notches 75 or through holes 76, respectively, in order to improve bonding strength with a synthetic resin.

Figure 7:
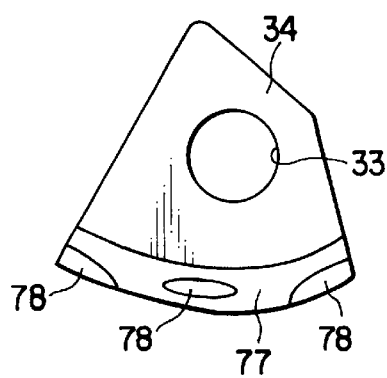

Also, one end of the holding frame 74 is formed with an attachment portion 80 having an L-shaped cross section, connecting the holding frame 74 with the spacer ring 34. As shown in FIG. 7, one end of the spacer ring 34 is formed with a recess 77 having a predetermined width. Further, a plurality of island-like protrusions 78 are formed on the bottom surface of the recess 77 so as to improve the bonding strength between the attachment portion 80 and the spacer ring 34.

The holding frame 74 is attached with a connector 82 at its one side adjacent to the one end of the piezo-electric element 72 and the spacer ring 34. The connector 82 has four metallic pins, that is, two terminals connected to the voice coil 44 and two terminals connected to the piezo-electric element 72.

Further, the holding frame 74 is integrally provided with a stopper 83 projecting from one end side portion which is apart from the piezo-electric element 72 and the attachment portion 80. The stopper 83 is formed with a through hole 84 for reducing an impact stress and has spring characteristics. Further, the stopper 83 is provided with a lock pin 86 which is mode of a ferromagnetic material and used for magnetic lock.

The actuator driving section 70 having the above mentioned construction is formed integrally with the holding frame 74 by filling a synthetic resin in a state of arranging the voice coil 44, piezo-electric element 72, spacer ring 34, connector 82 and the lock pin 86 in a predetermined positional relationship. Preferably, a thermoplastic resin is used as the synthetic resin, and in particular, it is suitable to use liquid crystal polymer having a low molding temperature, high molding precision and high bending rigidity. As described above, in the case where the piezo-electric element 72 is constructed in a manner that only both ends thereof are embedded in the holding frame 74, when molding the holding frame 74, the piezo-electric element 72 can be prevented form being excessively heated and being damaged.

As is clearly seen from FIG. 1, in a state of assembling the head actuator mechanism 22 having the aforesaid construction into the case 12, the magnetic disk 16 is situated between the arms 32a and 32b. The magnetic heads 40 attached to the suspension 38 extending from these arms 32a and 32b respectively oppose to each other with the magnetic disk 16 being interposed between them and contact with the upper and lower surfaces of the magnetic disk 16. A predetermined head load is applied to each magnetic head 40 by a spring force of the suspension 38, and each magnetic head 40 is urged to the surface of the magnetic disk 16.

Further, in a state of assembling the head actuator mechanism 22 into the case 12, the voice coil 44 of the actuator driving section 70 is situated between a pair of yokes 48 fixed on the case 12. These yokes 48 and a magnet (not shown) fixed to one yoke of them constitute the VCM 24. When the voice coil 44 is energized, the head actuator mechanism 22 is driven, and then, the magnetic heads 40 are moved and positioned onto desired tracks of the magnetic disk 16.

As shown in FIG. 1, the board unit 21 has a rectangular main board 51 fixed on the bottom wall of the case 12. On main board 51 are mounted various circuit components such as a magnetic head amplifier for amplifying a read signal from the magnetic head 40, connector and the like. Further, board unit 21 has a strip-like main flexible printed circuit board 54 (hereinafter, referred simply to as main FPC) which extends from the main board 51.

The main FPC 54 has a wiring pattern constituting signal lines connecting the magnetic heads 40 and the magnetic head amplifier, and cables for supplying current to the voice coil 44 of the head actuator mechanism 22 and the piezo-electric element 72. Further, an extending end portion 54*a* of the main FPC 54 is fixed to the spacer ring 34 of the head actuator mechanism 22 by means of a screw, and is provided with many connecting pads (not shown).

Respective magnetic heads 40 are electrically connected to the corresponding connecting pads of the main FPC 54 via relay flexible printed circuit boards (hereinafter, referred simply to as relay FPC) 60. As shown in FIGS. 3 and 4, the relay FPC 60 is stuck and fixed onto the surface of each arm 32*a* or 32*b* and the suspension 38, and extends from the distal end of the suspension 38 to the proximal end of each arm.

The relay FPC 60 is, as a whole, formed in an elongated belt-like shape, and has a distal end portion 60*a* situated on the distal end of the suspension 38, and a connecting end portion 60*b* led from the proximal end of the arm 32*a* or 32*b*. The distal end portion 60*a* is provided with four first electrode pads (not shown) connected electrically to electrodes of the magnetic head 40. Also, the connecting end portion 60*b* is provided with four second electrode pads 62. These second electrode pads 62 are soldered to the connecting pads provided on the extending end portion of the main FPC 54. In the manner as described above, each magnetic head 40 is electrically connected to the main FPC 54 via the relay FPC 60.

In the HDD constructed in the aforesaid manner, during operation, the magnetic disk 16 is rotated at a high speed by means of the spindle motor 18, and a servo system (not shown) supplies a driving current to the voice coil 44 of the VCM 24. Whereupon an electromagnetic force is generated in the operating side portions 44*c* and 44*d* of the voice coil 44 by the interaction of a magnetic field generated from the voice coil 44 with a magnetic field generated from the permanent magnet provided on the yoke 48, and then, the head actuator mechanism 22 is rotated around the bearing assembly 26. Each magnetic head 40 is moved in the radial direction of the magnetic disk 16 in a state of flying on the magnetic disk 16, and then, is positioned at a target track of the magnetic disk.

On the other hand, the servo system supplies a driving current to the voice coil 44 of the VCM 24 as described above while supplying a driving voltage to the piezo-electric element 72. As shown in FIG. 2, the piezo-electric element 72 is telescopically deformed in a degree of several microns in a longitudinal direction (direction of arrow A) in accordance with the supplied driving voltage so that a resonance mode is induced in the head actuator mechanism 22 and applies a vibration to the voice coil 44.

The piezo-electric element 72 is situated on the opposite side of the magnetic head 40 with respect to the bearing assembly 26 serving as the rotational axis of the head actuator mechanism 22, and is situated separately from an axial line C (nodal point of resonance mode) of the head actuator mechanism 22. As a result, during the resonance mode, the each magnetic head 40 is minutely moved in a direction of arrow by a micro distance in accordance with the telescopical deformation of the piezo-electric element 72 in the longitudinal direction A. Thus, it is possible to stably cancel a mechanical resonance mode resulting from the voice coil 44 of the head actuator mechanism 22 by the piezo-electric element 72. Therefore, it is possible to cancel the mechanical resonance mode applying bad influence to the positioning control of the magnetic heads on the head actuator mechanism 22, and to obtain flat characteristic with a high frequency band. Thus, a preferable positioning servo system can be realized with a wide frequency band; as a result, it is possible to realize a high-precise positioning operation of the magnetic heads.

Then, a construction of the control system of the head actuator mechanism 22 will be described.

In the control system according to the present embodiment, a band-pass filter 108 is provided in a control loop of the piezo-electric element 72 for operating to depress the mechanical resonance mode in the whole of the head actuator mechanism 22. Thus, an operating frequency of the piezo-electric element 72 is limited to an optimum range.

Figure 8:
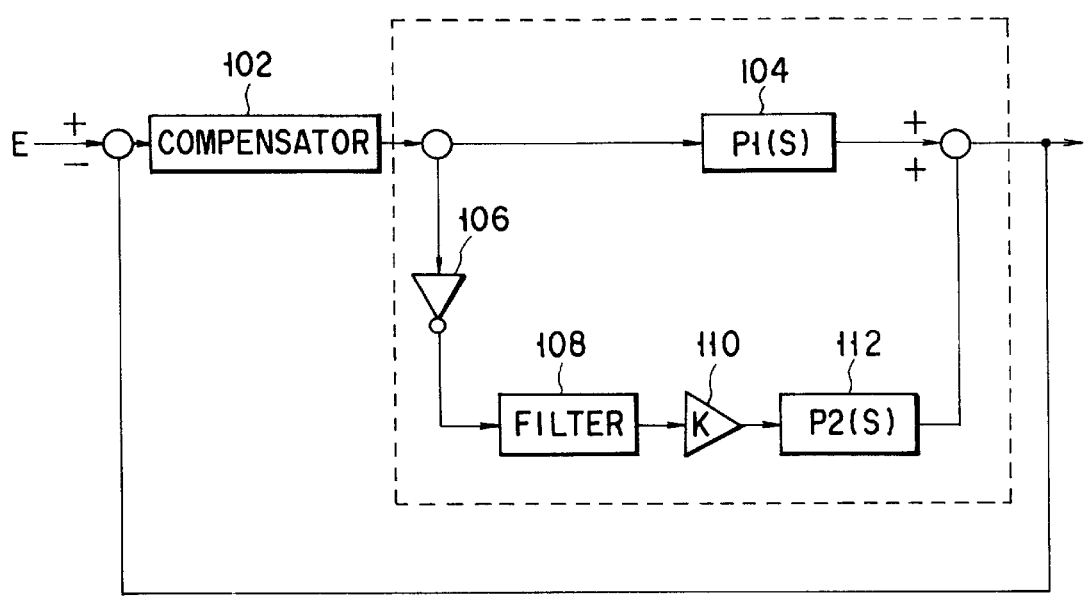

FIG. 8 shows a feedback control system constituting the control system of the head actuator mechanism 22 of the present embodiment. In FIG. 8, an input signal E of the control system is a positional error signal indicative of a positional error of the magnetic head 40 with respect to a target position. A servo data (cylinder number for speed control and burst data for position control) previously recorded in a servo area of the magnetic disk 16 is read by the magnetic head 40, and then, the positional error signal is produced on the basis of the servo data thus read.

As shown in FIG. 8, the positional error signal E is inputted to a coil driving section 104 (head transfer function is expressed as P1(S)) of the voice coil 42 via a compensator 102. The coil driving section 104 drives the VCM 24 on the basis of the inputted positional error signal E.

Meanwhile, the positional error signal E is inverted in its phase by means of an inversion amplifier 106, and then, an unnecessary band of the error signal is cut off by the band-pass filter 108 which passes only 2 kHz to 6 kHz band signal. Further, the positional error signal is amplified by a predetermined gain K by means of a gain section 110 (gain is expressed as K), and then, is inputted to an element driving section 112 (head transfer function is expressed as P2(S)) for the piezo-electric element 72.

Then, the magnetic head 40 is controlled to the target position on the magnetic disk 16 on the basis of the additive result of respective outputs from the coil driving section 104 and the element driving section 112. By employing the driving control system having the feedback system as described above, it is possible to cut off the peak of the second main resonance existing in 4.6 kHz of the head actuator mechanism 22, so that the magnetic head 40 can be moved to a target position with high precision.

Figure 9:
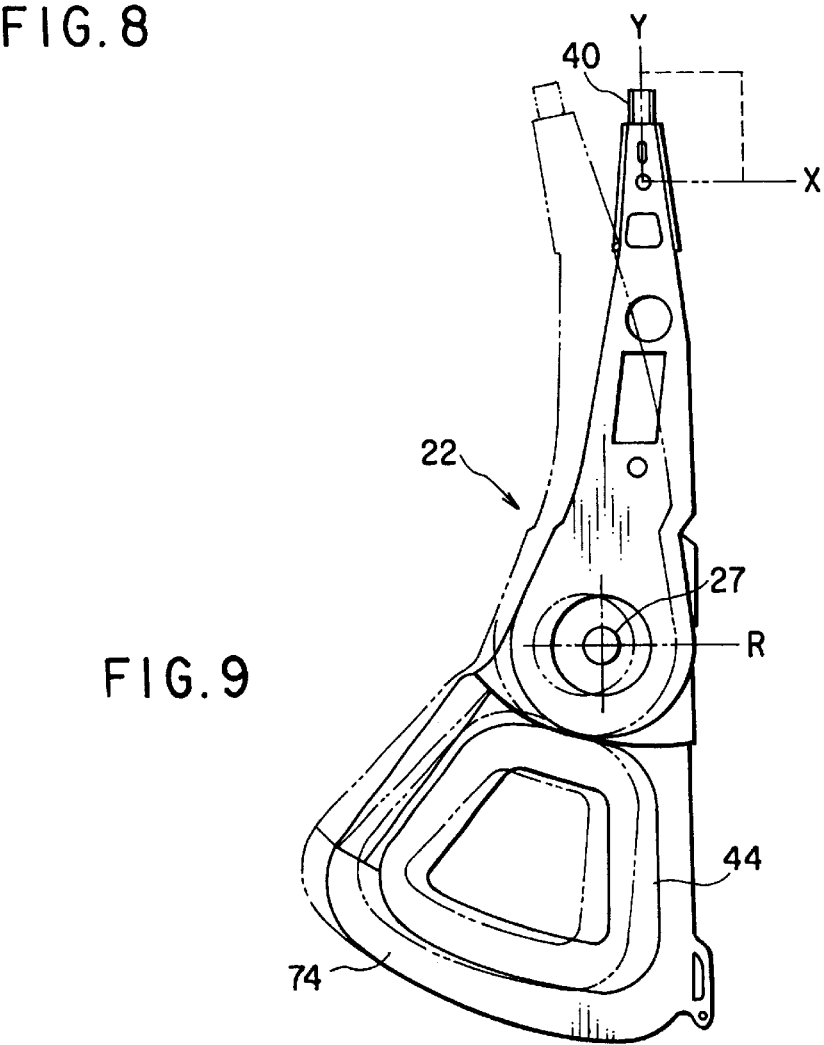

The operating principle of the aforesaid control system will be described. FIG. 9 shows a mechanical resonance mode of the whole of the head actuator mechanism 22 obtained by making analysis with the use of a natural frequency analytic routine of finite element method structure analysis with respect to the head actuator mechanism. The resonance mode is a mode wherein the voice coil 44 and the holding frame 74 greatly deform, and in this case, a resonance frequency is 4.6 kHz.

Figure 10:
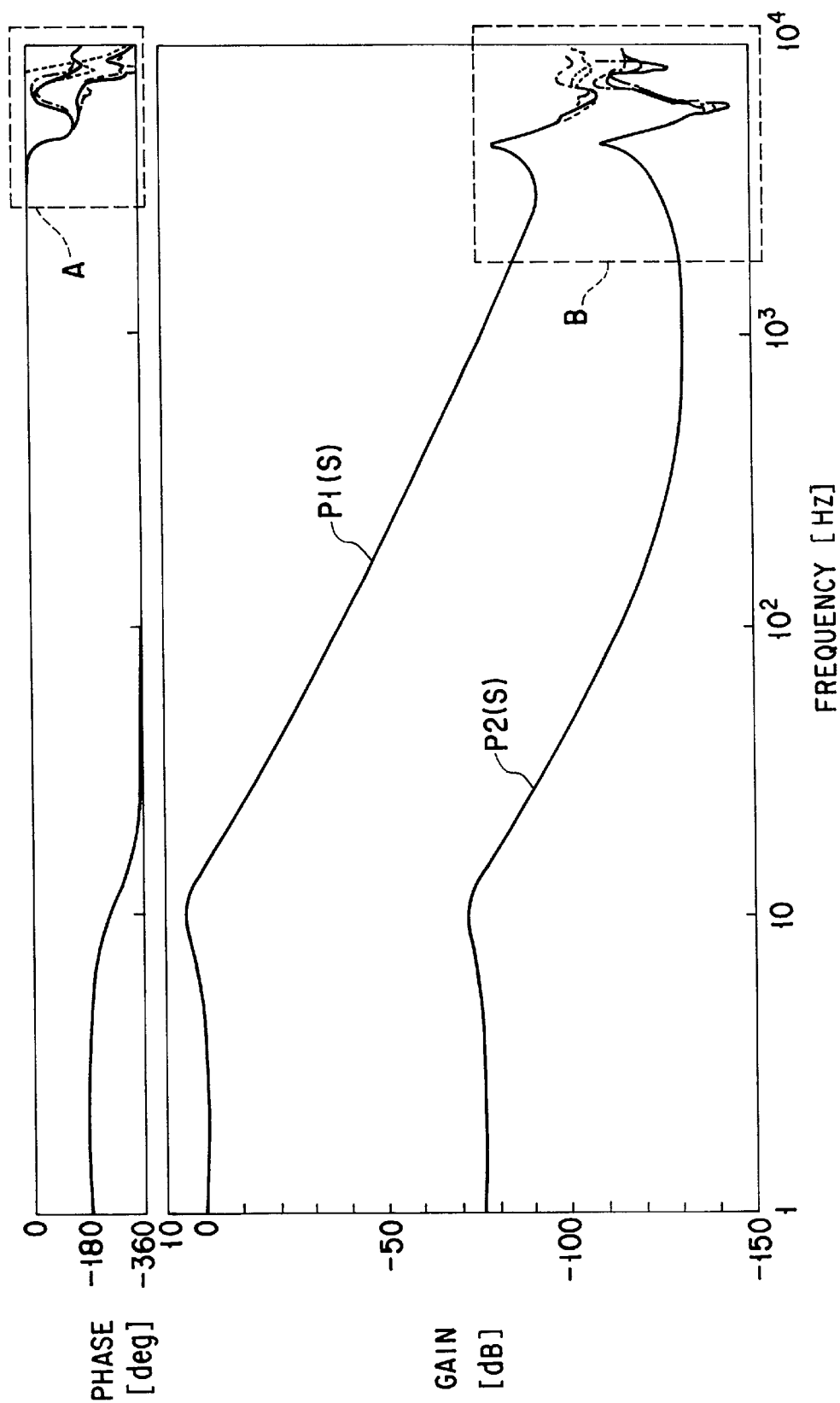
FIG. 10 is a chart showing analytic results of transfer function of the head actuator mechanism.

FIG. 10 is a graph showing the analytic result of head transfer function P1(S) relative to the VCM 24 and the analytic result of head transfer function P2(S) relative to the piezo-electric element 72 for each magnetic head 40. As seen from the above analytic results of the VCM 24 and the piezo-electric element 72, the second main resonance peak is made in 4.6 kHz frequency. This is caused by the vibration mode shown in FIG. 9.

The second main resonance peak relative to the VCM 24 and the second main resonance peak relative to the piezo-electric element 72 have the same phase but are different in gain. For this reason, a gain K in a preceding stage of the element driving section 112 is set so that the above two second main resonance peaks coincide with each other, and by doing so, it is possible to cut off and eliminate the resonance peak of 4.6 kHz.

Figure 11:
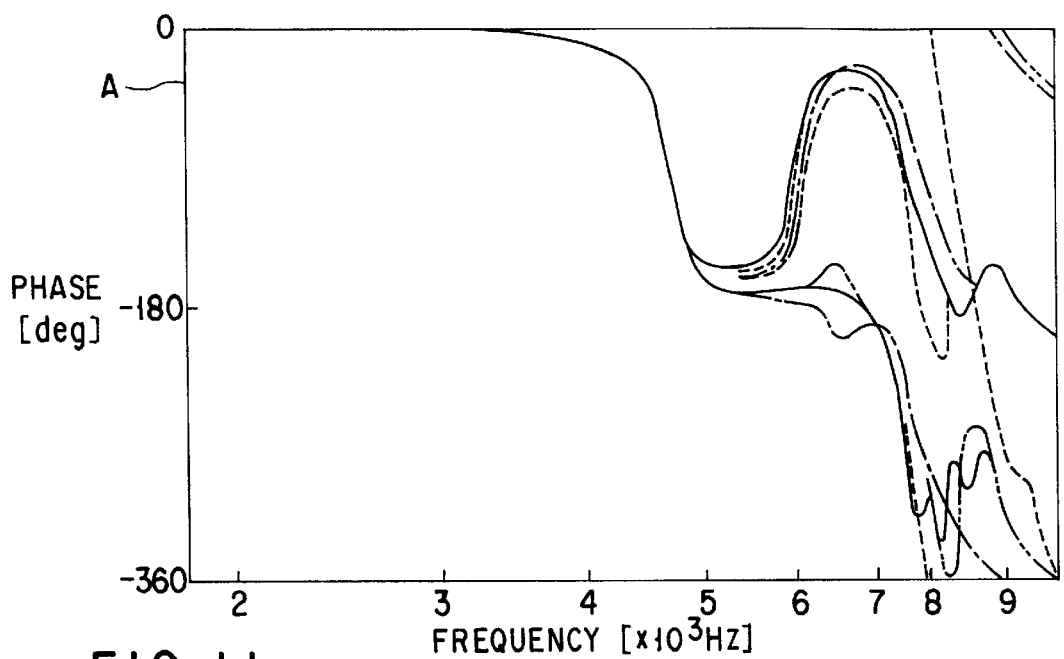
FIG. 11 is a chart enlarging a region A in FIG. 10.
Figure 12:
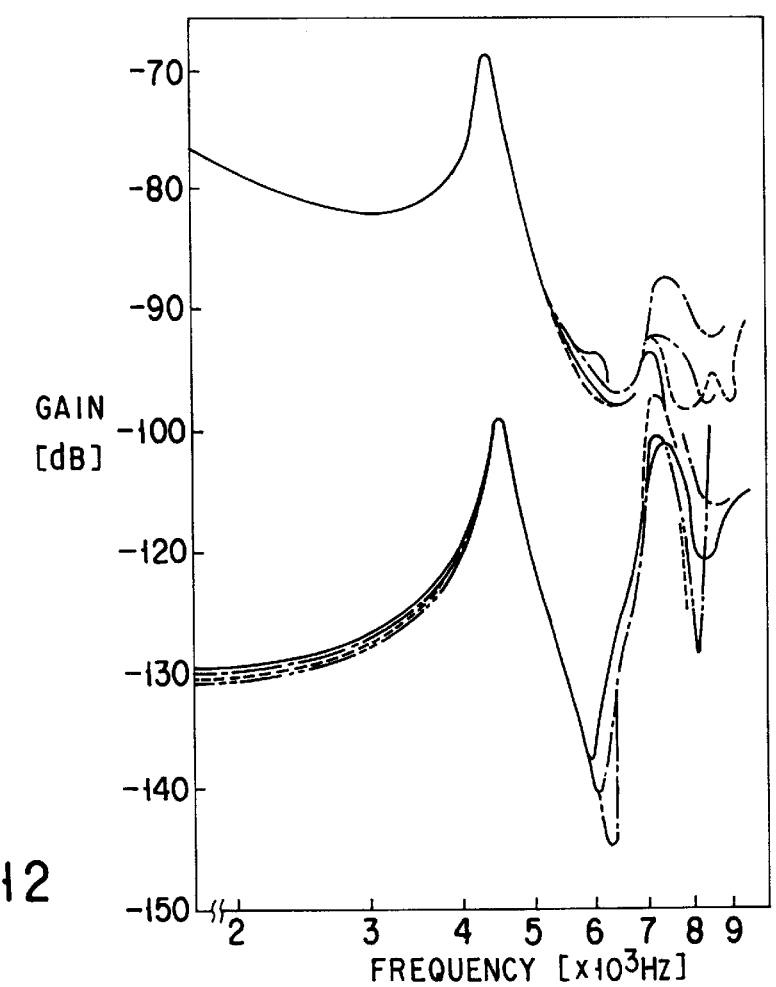
FIG. 12 is a chart enlarging region B in FIG. 10.

As show in FIG. 11 and FIG. 12 enlarging principal parts of FIG. 10, the phase in the vicinity of. 4.6 kHz is uniform with respect to the magnetic heads 40, and also, the peak value of 4.6 kHz gain relative to each magnetic head is uniform. This means the following matter; more specifically, when eliminating the aforesaid resonance peak of 4.6 kHz, it is possible to stably control the plurality of the magnetic heads without leaving the resonance of a specified magnetic head among these magnetic heads.

Further, a passing band (2 to 6 kHz) of the bandpass filter 108 is determined on the basis of the aforesaid analytic result. More specifically, a resonance frequency to be cut off is more than 1 kHz, and a high resonance frequency of several kHz or more may be disregarded because the absolute gain becomes small. Therefore, the passing frequency band of the band-pass filter 108 may be set to a value properly increased and decreased in the vicinity of 4.6 kHz second main resonance frequency to be cut off. Also, in order to prevent unnecessary phase rotation, it should be considered that the second main resonance frequency is set to an approximately middle value of the passing frequency band of the band-pass filter 108.

Taking the aforesaid matter into consideration, an upper limit frequency and a lower limit frequency of the passing band of the band-pass filter 108 are respectively set to 2 kHz and 6 kHz which is a frequency when the second main resonance builds up (see FIG. 11) so as not to include other peaks in addition to the second main resonance peak.

In the case where the passing band of the band-pass filter 108 is set to a range of 2 to 6 kHz, the piezo-electric element 72 driven by the element driving section 112 provided in the after-stage of the band-pass filter 108 is actuated in a range of 2 to 6 kHz frequency, and thus, only second main resonance peak in the range of 2 to 6 kHz is cut off. Therefore, there is no influence given to the piezo-electric element 72 in the resonance frequency of another peaks.

In other words, a low frequency band including a DC and a high frequency band of several kHz or more are cut off by means of the band-pass filter 108 so that the operating band of the piezo-electric element 72 is limited to a range of 2 to 6 kHz. Thus, it is possible to prevent a reduction in stabilization of the serve system due to the piezo-electric element 72.

As a result, it is possible to increase a gain cross frequency of the servo system. More specifically, the magnetic head 40 can follow a target track on the magnetic disk 16 until high frequency band. Therefore, it is possible to improve a head positioning accuracy, and the track pitch of the magnetic disk 16 can be reduced. As a result, it is possible to realize an increase of memory capacity of the HDD.

The filter 108 may be good for a high pass filter when higher resonant gain is small. In this case, phase characteristic is better than the case of the band pass filter.

Further, since the frequency range for operating the piezo-electric element 72 is limited, the power consumption of the piezo-electric element 72 can be reduced.

As is evident from the above description, with the HDD according to the present embodiment, the mechanical resonance mode resulting from the VCM 24 of the head actuator mechanism 22 can be stably cancelled by the piezo-electric element 72. Whereby it is possible to solve the problems of bad influence due to variation in characteristics of the piezo-electric element and complication in control method. Therefore, it is possible to make the open loop characteristic of the magnetic head positioning control system to be flat until high frequency band, and to realize a preferable positioning servo system with a higher frequency band. As a result, the head positioning operation can be performed with high precision.

Further, with the HDD having the aforesaid construction, the voice coil 44, the piezo-electric element 72 and the spacer ring 34 of the actuator driving section 70 are integrally connected and held by the holding frame 74 made of a synthetic resin. Thus, it is possible to improve the mechanical strength and assembling performance of the actuator driving section 70, so that the actuator driving section can be made thin and light.

Moreover, the voice coil 44 and the connector 82 for power source of the piezo-electric element 72 are molded of a synthetic resin integrally with the actuator driving section 70, so that wiring can be simplified, and also, a reduction in connection fault can be achieved.

No restriction is given to the piezo-electric element 72 by component members on the support arm side having no enough space because the piezo-electric element 72 is arranged in the vicinity of the voice coil with a relatively enough space. Therefore, the HDD can be made thin over the entirety.

A piezo-electric element having a piezo-electric lateral effect generates a large displacement and can be made thin, so that it is preferable to use this type of piezo-electric element as the piezo-electric element 72 in the present embodiment. The piezo-electric lateral effect means such a characteristic wherein, when the piezo-electric element is clamped between electrodes, it expands in a direction perpendicular to the direction toward the electrodes.

In the above embodiment, only both ends of the piezo-electric element 72 are embedded in the holding frame 74 so as to be held therein, and other portions are exposed outside. Therefore, the holding frame 74 may be formed of a synthetic resin having a high molding temperature, for example, polycarbonate and the like.

Figure 13:
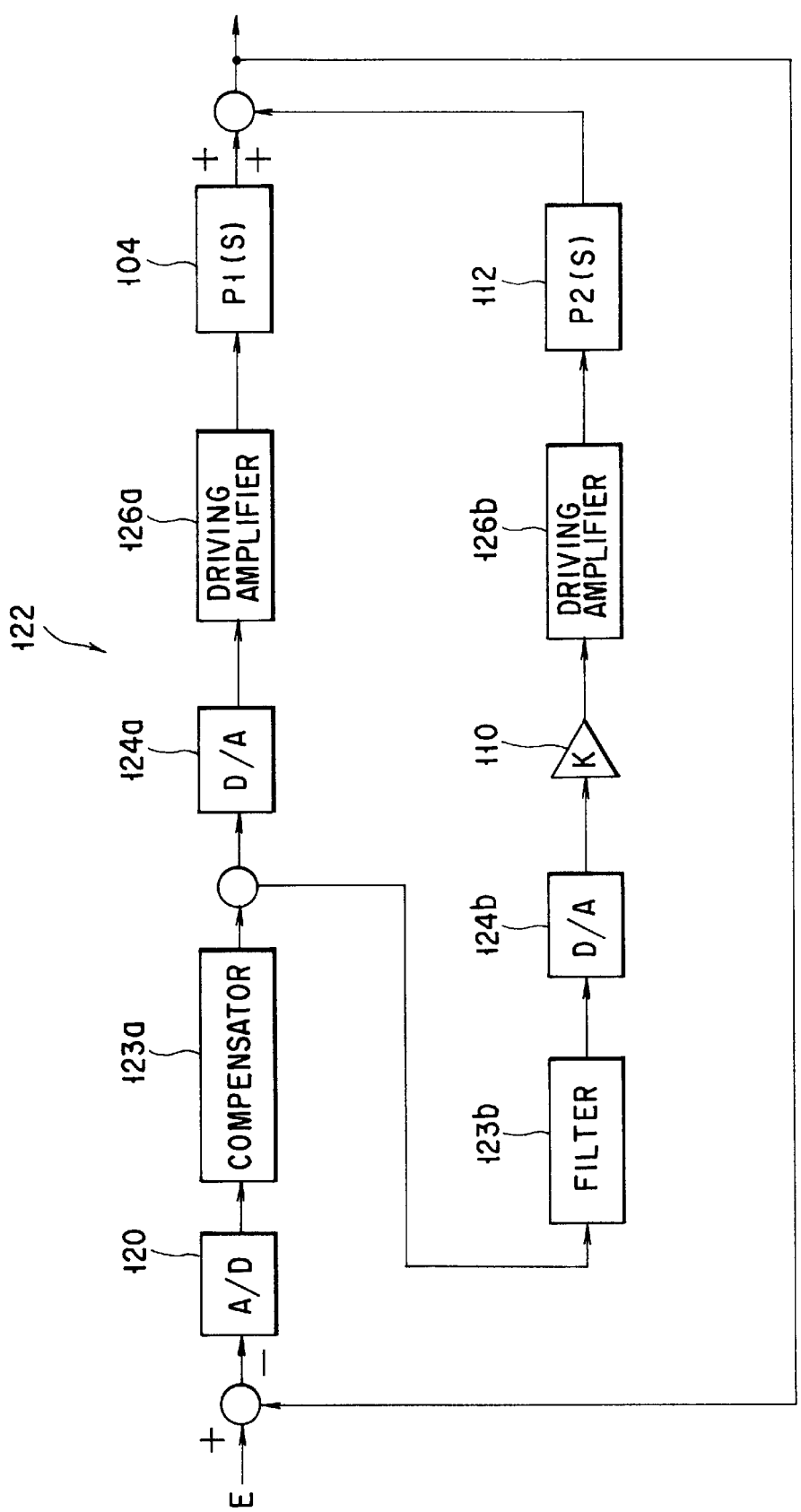
FIG. 13 is a block diagram showing another control system of the HDD according to the present invention.

The present invention is not specially limited to the aforesaid embodiment, and various modifications can be made within a scope of the present invention. For example, the control system of the head actuator mechanism 22 may use a digital control system including a micro processor unit (MPU) as shown in FIG. 13.

In the digital control system, the positional error signal E read from the magnetic disk 16 by the magnetic head 40 is converted into a digital data by means of an A/D converter 120, and then, is inputted to an MPU 122.

The MPU 122 has a built-in compensator 123a and filter 123b which function as a digital filter. More specifically, the function of the compensator 123a and the filter 123b is obtained from digital filter operational processing by the MPU 122. A digital control output supplied from the compensator 123a is converted into an analog signal by means of a D/A converter 124a, and then, amplified by means of a driving amplifier 126a. The amplified control output is inputted to the coil driving section 104.

On the other hand, a digital control output supplied from the filter 123b is converted into an analog signal by means of a D/A converter 124b, and then, multiplied by a gain K by means of a gain element 110. Thus, the multiplied control output is amplified by means of a driving amplifier 126b. The output from the driving amplifier 126b is inputted to an element driving section 112. The gain element 110 may be set during internal operation of the MPU.

The following is a description on setting a sampling frequency of the A/D converter 120.

At the main resonance frequency, phase angle rotates 180° in the transfer function. A first (primary) main resonance frequency ranges from approximately 10 to 20 Hz, a second (secondary) main resonance frequency becomes about 4.6 kHz, and a third (tertiary) main resonance frequency becomes about 7 kHz (see FIGS. 10 to 12).

The resonance frequency mode to be cut off by the piezo-electric element 72 is the second main resonance frequency mode at 4.6 kHz. If the second main resonance frequency mode is cut off, the third main resonance mode relative to the seek direction of the head actuator mechanism 22 is amplified in reverse; for this reason, the servo system becomes unstable.

A discrete servo system has notch filter characteristics such that the gain is zero at a sampling frequency, and the gain is −4 dB at a ½ sampling frequency. Thus, if the tertiary main resonance frequency is set so as to exist in a band of ½ sampling frequency or more, the loop gain lowers; as a result, the servo system is stabilized. Further, the frequency important to the servo system ranges from the DC to ½ of the sampling frequency. Thus, if the tertiary main resonance frequency is set to the ½ sampling frequency or more, no third resonance appears in the servo system; as a result, the servo system is stabilized.

Therefore, in order to stabilize the servo system, the sampling frequency of the servo system, that is, the sampling frequency of the A/D converter 120 may be set so that a value of ½ of the sampling frequency becomes the third main resonance frequency of the VCM 24 or more. In other words, the sampling frequency of the A/D converter 120 may be set to twice as much as the third main resonance frequency resulting from the drive of the VCM 24 or less. In the head actuator mechanism 22 shown in FIGS. 1 to 4, the third main resonance frequency is 7 kHz (see FIGS. 11 and 12), therefore, the sampling frequency may be set to 14 kHz. As a result, the third main resonance peak is restricted, so that the stabilization of servo system can be improved.

Moreover, according to the present invention, in addition to the aforesaid control system, the construction of the actuator driving section 70 can be variously modified. For example, as shown in FIG. 14, in the actuator driving section 70, a synthetic resin forming the holding frame 74 may be filled between the piezo-electric element 72 and the voice coil 44. By doing so, it is possible to further improve a mechanical strength of the actuator driving section 70.

Also, as shown in FIG. 15, in the actuator driving section 70, the outer side surface of the piezo-electric element 72 may be covered with a synthetic resin. In this case, it is possible to protect the piezo-electric element 72 against an external impact.

Further, as shown in FIG. 16, in the actuator driving section 70, the entirety of piezo-electric element 72 may be covered with a synthetic resin. In this case, it is possible to improve the mechanical strength of the actuator driving section, and to enhance a impact resistant performance.

Figure 17:
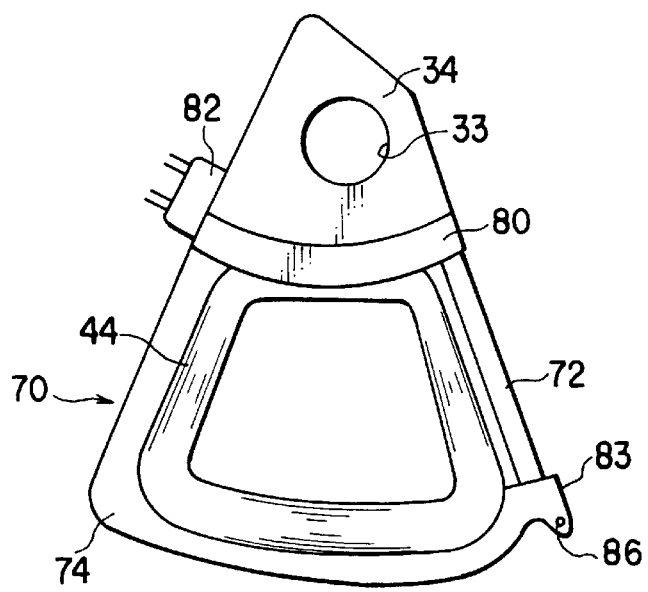
FIG. 17 is a plan 2 view showing an actuator driving section of a head actuator mechanism according to still another embodiment of the present invention.
Figure 18:
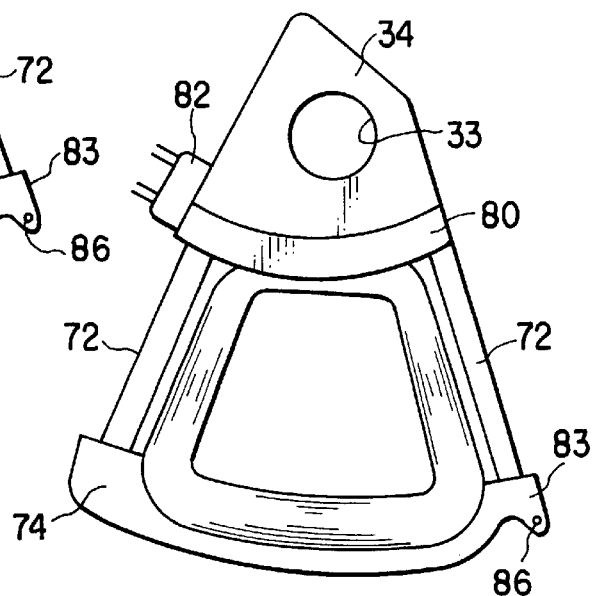
FIG. 18 is a plane view showing an actuator driving section of a head actuator mechanism according to another embodiment of the present invention.
Figure 19:
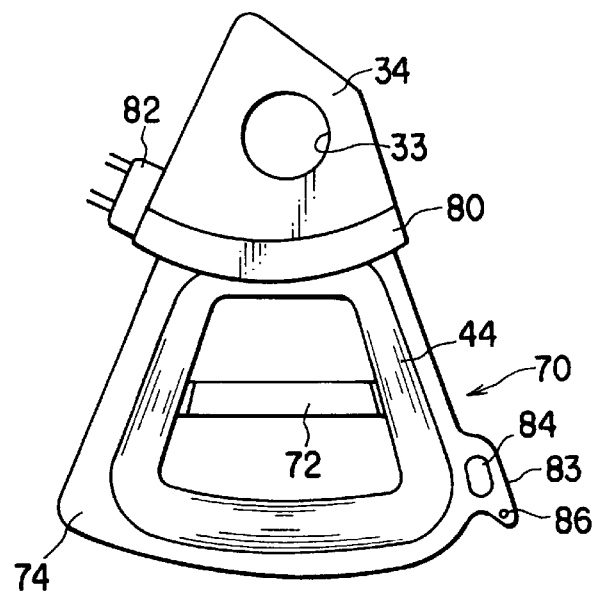
FIG. 19 is a plane view showing an actuator driving section of a head actuator mechanism according to still another embodiment of the present invention.

In the aforesaid embodiment, the piezo-electric element 72 has been provided on the left-hand side of the voice coil 44. Without being specially limited to this arrangement, the piezo-electric element 72 may be provided on the other side of the voice coil 44, that is, on the stopper 83 side, as shown in FIG. 17, or may be provided on both sides of the voice coil 44, as shown in FIG. 18.

Further, in the aforesaid embodiment, the holding frame 74 has the substantially same thickness as that of the voice coil 44, and thereby, the entirety of HDD can be made thin. In the case where there is margin in the thickness of the HDD itself, the whole surface of voice coil 44 may be covered with a synthetic resin. In this case, the mechanical strength of the actuator driving section 70 can be further improve.

The connector 82 embedded in the holding frame 74 may include any one of two terminals connected to the voice coil 44 or two terminals connected to the piezo-electric element 72.

Moreover, if the piezo-electric element 72 is provided on the side opposite to the arms 32*a* and 32*b* across the pivotal shaft 27, the piezo-electric element 72 can sufficiently exhibit its function, and may be supported inside the voice coil 44.

Besides, for example, the number of the magnetic disks, the number of magnetic heads corresponding to these magnetic disks, the number of arms or the like may be increased if necessary.

Additional advantages and modifications will readily occurs to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A head actuator mechanism comprising:

a suspension supporting a magnetic head for recording and reading information with respect to a magnetic disk;

an arm supporting the suspension;

a support section which is rotatable around a predetermined rotational axis and supports the arm; and a driving section supported by the support section and arranged on a side opposite to the arm across the rotational axis, the driving section having a driving coil which generates a driving force for moving the magnetic head in a substantially radial direction of the magnetic disk, and an auxiliary driving section for depressing at least one of the resonances of the magnetic head resulting from the drive of the driving coil, wherein the support section extends in a direction opposite to the arm across the rotational axis and has a holding frame supporting the driving coil, and the auxiliary driving section includes a piezo-electric element supported by the holding frame, the holding frame is molded of a resin integrally with the driving coil and the piezo-electric element, and holds the driving coil and the piezo-electric element, and the piezo-electric element is arranged along one side surface of the driving coil, and the holding frame covers both longitudinal end portions of the piezo-electric element, a side edge portion on the driving coil side of the piezo-electric element, and the whole circumference of the driving coil.

2. A magnetic disk drive comprising:

a magnetic disk;

driving means for supporting and rotating the magnetic disk;

a magnetic head for recording and reading information with respect to the magnetic disk; and a head actuator mechanism having a suspension supporting the magnetic head, an arm supporting the suspension, a support section which is rotatable around a predetermined rotational axis and supports the arm, and a driving section supported by the support section and arranged on a side opposite to the an across the rotational axis, the driving section having a driving coil which generates a driving force for moving the magnetic head in a substantially radial direction of the magnetic disk, and an auxiliary driving section for depressing at least one of the resonances of the magnetic head resulting from the drive of the driving coil, wherein the holding frame is molded of a resin integrally with the driving coil and the piezo-electric element and holds the driving coil and the piezo-electric element, and the piezo-electric element has an elongated shape, both longitudinal end portions embedded in the holding frame, and notches or through holes formed in the longitudinal both end portions.

3. A head actuator mechanism comprising:

a suspension supporting a magnetic head for recording and reading information with respect to a magnetic disk;

an arm supporting the suspension;

a support section which is rotatable around a predetermined rotational axis and supports the arm; and a driving section supported by the support section and arranged on a side opposite to the arm across the rotational axis, the driving section having a driving coil which generates a driving force for moving the magnetic head in a substantially radial direction of the magnetic disk, and an auxiliary driving section for depressing at least one of the resonances of the magnetic head resulting from the drive of the driving coil, wherein the support section extends in a direction opposite to the arm across the rotational axis and has a holding frame supporting the driving coil, and the auxiliary driving section includes a piezo-electric element supported by the holding frame, the holding frame is molded of a resin integrally with the driving coil and the piezo-electric element, and holds the driving coil and the piezo-electric element, and the piezo-electric element is arranged along one side surface of the driving coil, and the holding frame covers both longitudinal end portions of the piezo-electric element, a side edge portion of the piezo-electric element opposite to the driving coil, and a side surface of the driving coil opposite to said one side surface.

4. A head actuator mechanism comprising:

a suspension supporting a magnetic head for recording and reading information with respect to a magnetic disk;

an arm supporting the suspension;

a support section which is rotatable around a predetermined rotational axis and supports the arm; and a driving section supported by the support section and arranged on a side opposite to the arm across the rotational axis, the driving section having a driving coil which generates a driving force for moving the magnetic head in a substantially radial direction of the magnetic disk, and an auxiliary driving section for depressing at least one of the resonances of the magnetic head resulting from the drive of the driving coil, wherein the support section extends in a direction opposite to the arm across the rotational axis and has a holding frame supporting the driving coil, and the auxiliary driving section includes a piezo-electric element supported by the holding frame, the holding frame is molded of a resin integrally with the driving coil and the piezo-electric element, and holds the driving coil and the piezo-electric element, and the piezo-electric element is arranged along one side surface of the driving coil, and the holding frame covers the whole of piezo-electric element and the whole circumference of the driving coil.

5. A head actuator mechanism comprising:

a suspension supporting a magnetic head for recording and reading information with respect to a magnetic disk;

an arm supporting the suspension;

a support section which is rotatable around a predetermined rotational axis and supports the arm; and a driving section supported by the support section and arranged on a side opposite to the arm across the rotational axis, the driving section having a driving coil which generates a driving force for moving the magnetic head in a substantially radial direction of the magnetic disk, and an auxiliary driving section for depressing at least one of the resonances of the magnetic head resulting from the drive of the driving coil, wherein the support section extends in a direction opposite to the arm across the rotational axis and has a holding frame supporting the driving coil, and the auxiliary driving section includes a piezo-electric element supported by the holding frame, the holding frame is molded of a resin integrally with the driving coil and the piezo-electric element, and holds the driving coil and the piezo-electric element, and the piezo-electric element has an elongated shape, both of longitudinal end portions embedded in the holding frame, and notches or through holes formed in each of the longitudinal both end portions.

* * * * *